(12) United States Patent
Zhou

(10) Patent No.: US 10,489,572 B2
(45) Date of Patent: *Nov. 26, 2019

(54) METHOD FOR SCREEN UNLOCKING OF TERMINAL BASED ON FINGERPRINT IDENTIFICATION AND TERMINAL

(71) Applicant: Guangdong Oppo Mobile Telecommunications Corp., Ltd., Dongguan, Guangdong (CN)

(72) Inventor: Yibao Zhou, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/190,722

(22) Filed: Nov. 14, 2018

(65) Prior Publication Data

US 2019/0080073 A1    Mar. 14, 2019

Related U.S. Application Data

(63) Continuation of application No. 15/987,571, filed on May 23, 2018, and a continuation of application No. PCT/CN2016/088396, filed on Jul. 4, 2016.

(30) Foreign Application Priority Data

Mar. 10, 2016   (CN) .......................... 2016 1 0137653

(51) Int. Cl.
*G06F 21/32*      (2013.01)
*G06F 3/0488*     (2013.01)
(Continued)

(52) U.S. Cl.
CPC ............ *G06F 21/32* (2013.01); *G06F 3/0488* (2013.01); *G06F 21/36* (2013.01);
(Continued)

(58) Field of Classification Search
CPC ........ G06F 21/32; G06F 21/36; G06F 3/0488; G06K 9/00087; H04W 12/06; H04W 88/02; H04L 63/0861
See application file for complete search history.

(56) References Cited

U.S. PATENT DOCUMENTS 6,980,672 B2 * 12/2005 Saito .................. G06K 9/00006
                                                          340/5.53
7,979,716 B2 *  7/2011 Fiske ...................... G06F 21/32
                                                           711/164
(Continued)

FOREIGN PATENT DOCUMENTS

CN      103685232 A      3/2014
CN      104391635 A      3/2015
(Continued)

OTHER PUBLICATIONS

International search report issued in corresponding international application No. PCT/CN2016/088396 dated Nov. 28, 2016.
(Continued)

*Primary Examiner* — Joseph P Hirl
*Assistant Examiner* — Stephen T Gundry
(74) *Attorney, Agent, or Firm* — Young Basile Hanlon & MacFarlane, P.C.

(57) ABSTRACT

A method for screen unlocking of a terminal based on fingerprint identification and a terminal are provided. User operation instruction on a designated unlocking area of the terminal is acquired. Press interrupt request is initiated when a strength value of a touch operation corresponding to the user operation instruction is greater than preset strength threshold. Fingerprint data on the designated unlocking area are collected while waiting for response to the press interrupt request during a waiting time period from initiation of the press interrupt request to respond to the press interrupt request. The fingerprint data are compared with fingerprint (Continued)

verification data pre-stored in an external storage space of the terminal during the waiting time period. A screen interface of the terminal is enabled and the terminal screen is lit up when a response instruction of the press interrupt request is received, when fingerprint data and fingerprint verification data are matched.

12 Claims, 5 Drawing Sheets

(51) Int. Cl.
  *G06F 21/36* (2013.01)
  *H04L 29/06* (2006.01)
  *H04W 12/06* (2009.01)
  *H04W 88/02* (2009.01)
  *H04W 12/00* (2009.01)

(52) U.S. Cl.
  CPC ......... *H04L 63/0861* (2013.01); *H04W 12/06* (2013.01); *H04W 12/00503* (2019.01); *H04W 88/02* (2013.01)

(56) References Cited

U.S. PATENT DOCUMENTS

| | | | | |
|---|---|---|---|---|
| 8,904,479 | B1* | 12/2014 | Johansson | G06F 21/36 726/2 |
| 9,021,270 | B1* | 4/2015 | Byers | H04L 63/0861 713/186 |
| 9,600,709 | B2 | 3/2017 | Russo | |
| 9,696,762 | B2 | 7/2017 | Zhang et al. | |
| 9,733,752 | B2* | 8/2017 | Park | G06F 3/0412 |
| 9,779,419 | B2 | 10/2017 | Jung et al. | |
| 9,928,355 | B2* | 3/2018 | Boshra | G06F 21/32 |
| 9,940,448 | B2* | 4/2018 | Bao | G06F 21/32 |
| 10,013,595 | B2 | 7/2018 | Sreenivas | |
| 2004/0021552 | A1* | 2/2004 | Koo | G07C 9/00087 340/5.53 |
| 2006/0034497 | A1* | 2/2006 | Manansala | G06K 9/001 382/124 |
| 2008/0024272 | A1* | 1/2008 | Fiske | E05B 47/0002 340/5.83 |
| 2009/0002126 | A1* | 1/2009 | Okazaki | G06F 21/32 340/5.53 |
| 2009/0224874 | A1* | 9/2009 | Dewar | G06F 21/32 340/5.53 |
| 2009/0258667 | A1* | 10/2009 | Suzuki | G06F 21/32 455/550.1 |
| 2010/0225607 | A1* | 9/2010 | Kim | G06F 3/042 345/173 |
| 2011/0080260 | A1* | 4/2011 | Wang | G06F 21/32 340/5.83 |
| 2012/0071149 | A1* | 3/2012 | Bandyopadhyay | G06F 1/1643 455/418 |
| 2014/0295795 | A1* | 10/2014 | Miyazaki | H04W 12/06 455/411 |
| 2014/0320396 | A1* | 10/2014 | Modarres | G06F 3/0412 345/156 |
| 2014/0376181 | A1* | 12/2014 | Zhang | E05B 47/026 361/679.55 |
| 2015/0047017 | A1 | 2/2015 | Kim et al. | |
| 2015/0089631 | A1* | 3/2015 | Bao | G06F 21/32 726/16 |
| 2015/0294101 | A1* | 10/2015 | Wen | G06F 21/32 726/28 |
| 2015/0350202 | A1* | 12/2015 | Wei | G06F 21/32 726/18 |
| 2015/0378595 | A1* | 12/2015 | Jung | H04W 4/02 715/835 |
| 2016/0140379 | A1* | 5/2016 | Pedersen | G06K 9/00919 726/19 |
| 2016/0203306 | A1* | 7/2016 | Boshra | G06F 21/32 |
| 2016/0210624 | A1* | 7/2016 | Niu | G06K 9/00013 |
| 2016/0295007 | A1* | 10/2016 | Zhu | H04L 63/083 |
| 2016/0328594 | A1* | 11/2016 | Che | G06K 9/00046 |
| 2016/0350523 | A1* | 12/2016 | Tanno | G06F 21/44 |
| 2017/0039410 | A1* | 2/2017 | Pi | G06F 1/1643 |
| 2017/0039414 | A1* | 2/2017 | Sreenivas | G06F 3/041 |
| 2017/0063852 | A1* | 3/2017 | Azar | G06F 21/32 |
| 2017/0091523 | A1* | 3/2017 | Chen | G06K 9/4652 |
| 2017/0185765 | A1* | 6/2017 | Pang | G06F 21/32 |
| 2017/0200039 | A1* | 7/2017 | Wright | G06K 9/00026 |
| 2017/0220843 | A1* | 8/2017 | Apostolos | H04M 1/673 |
| 2017/0286660 | A1* | 10/2017 | Li | G06F 21/32 |
| 2017/0372055 | A1* | 12/2017 | Robinson | H04W 12/06 |

FOREIGN PATENT DOCUMENTS

| | | |
|---|---|---|
| CN | 104899029 A | 9/2015 |
| CN | 105183360 A | 12/2015 |
| CN | 105227776 A | 1/2016 |
| CN | 105303090 A | 2/2016 |
| EP | 2672416 A1 | 12/2013 |
| EP | 2851829 A1 | 3/2015 |

OTHER PUBLICATIONS

Extended European search report issued in corresponding European application No. 16893200.2 dated Aug. 1, 2018.

* cited by examiner

METHOD FOR SCREEN UNLOCKING OF TERMINAL BASED ON FINGERPRINT IDENTIFICATION AND TERMINAL

CROSS-REFERENCE TO RELATED APPLICATION(S)

This application is a continuation of U.S. application Ser. No. 15/987,571, filed on May 23, 2018, which is a continuation of International Application No. PCT/CN2016/088396, filed on Jul. 4, 2016, which claims priority to Chinese Application No. 201610137653.3, filed on Mar. 10, 2016, the disclosures of all of which are herein incorporated by reference in their entireties.

TECHNICAL FIELD

The present disclosure relates to the field of communication, and particularly to a method for screen unlocking of a terminal based on fingerprint identification and a terminal.

BACKGROUND

As technologies of terminal devices such as mobile phones advanced rapidly, fingerprint identification technology has become a standard configuration of mainstream terminals. Fingerprint identification technology can be used for screen wake-up, unlocking, mobile payment, and other functions of the terminal.

In the related art, fingerprint identification unlocking may include screen-on unlock and screen-off unlock, that is unlocking a screen of a mobile phone in a screen-on state or in a screen-off state. In addition, the screen-off unlock further includes screen-off press-to-unlock, that is press-to-trigger to unlock a screen of the mobile phone. In the related art, processes for screen-off press-to-unlock can be achieved as acquiring a press instruction, initiating a press interrupt request, receiving a response instruction of the press interrupt request, collecting fingerprint data, comparing the fingerprint data, unlocking a lock-screen interface, and lighting up a screen. Accordingly, time of the screen-off press-to-unlock may include acquiring time of the press instruction, initiating time of the press interrupt request, waiting time in response to the press interrupt request, collecting time of the fingerprint data, comparing time of the fingerprint data, unlocking time of the lock-screen interface, and time of lighting up the screen.

SUMMARY

Implementations of the disclosure provide a method for screen unlocking of a terminal based on fingerprint identification and a terminal.

A method for screen unlocking of a terminal based on fingerprint identification is provided in implementations of the disclosure. The method may include the follows.

A user operation instruction on a designated unlocking area of the terminal is acquired. The user operation instruction is configured to trigger screen unlocking of the terminal. The screen unlocking of the terminal includes acquiring the user operation instruction, initiating a press interrupt request, responding to the press interrupt request, unlocking a lock-screen interface of the terminal, and lighting up a screen.

The press interrupt request is initiated when a strength value of a touch operation corresponding to the user operation instruction is greater than a preset strength threshold.

The press interrupt request is configured to request a processor to respond to the user operation instruction. Fingerprint data on the designated unlocking area are collected while waiting for response to the press interrupt request during a waiting time period from initiation of the press interrupt request to response to the press interrupt request.

The fingerprint data are compared with fingerprint verification data pre-stored in an external storage space of the terminal during the waiting time period from the initiation of the press interrupt request to the response to the press interrupt request.

A screen interface of the terminal is enabled and the screen of the terminal is lit up when a response instruction of the press interrupt request is received, when the fingerprint data and the fingerprint verification data are matched.

A terminal is provided in implementations of the disclosure. The terminal may include an acquiring unit, a collecting unit, a comparing unit, and an unlocking unit.

The acquiring unit is configured to acquire a user operation instruction on a designated unlocking area of the terminal. The user operation instruction is configured to trigger screen unlocking of the terminal. The screen unlocking of the terminal includes acquiring the user operation instruction, initiating a press interrupt request, responding to the press interrupt request, unlocking a lock-screen interface of the terminal, and lighting up a screen.

The collecting unit is configured to initiate the press interrupt request when a strength value of a touch operation corresponding to the user operation instruction is greater than a preset strength threshold, the press interrupt request being configured to request a processor to respond to the user operation instruction, and collect fingerprint data on the designated unlocking area during while waiting for response to the press interrupt request during a waiting time period from initiation of the press interrupt request to response to the press interrupt request.

The comparing unit is configured to compare the fingerprint data with fingerprint verification data pre-stored in an external storage space of the terminal during the waiting time period from initiation of the press interrupt request to the response to the press interrupt request.

The unlocking unit is configured to enable a screen interface of the terminal and light up the screen of the terminal when a response instruction of the press interrupt request is received, when the comparing unit determines that the fingerprint data and the fingerprint verification data are matched.

Another terminal is also provided. The terminal includes a memory configured to store a set of program codes and a processor configured to invoke the set of program codes stored in the memory to execute all or part of the actions of any method according to the first aspect of the implementations of the present disclosure.

BRIEF DESCRIPTION OF THE DRAWINGS

To describe the technical solutions in the implementations of the present disclosure more clearly, the following briefly introduces the accompanying drawings required for describing the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Figure 1:
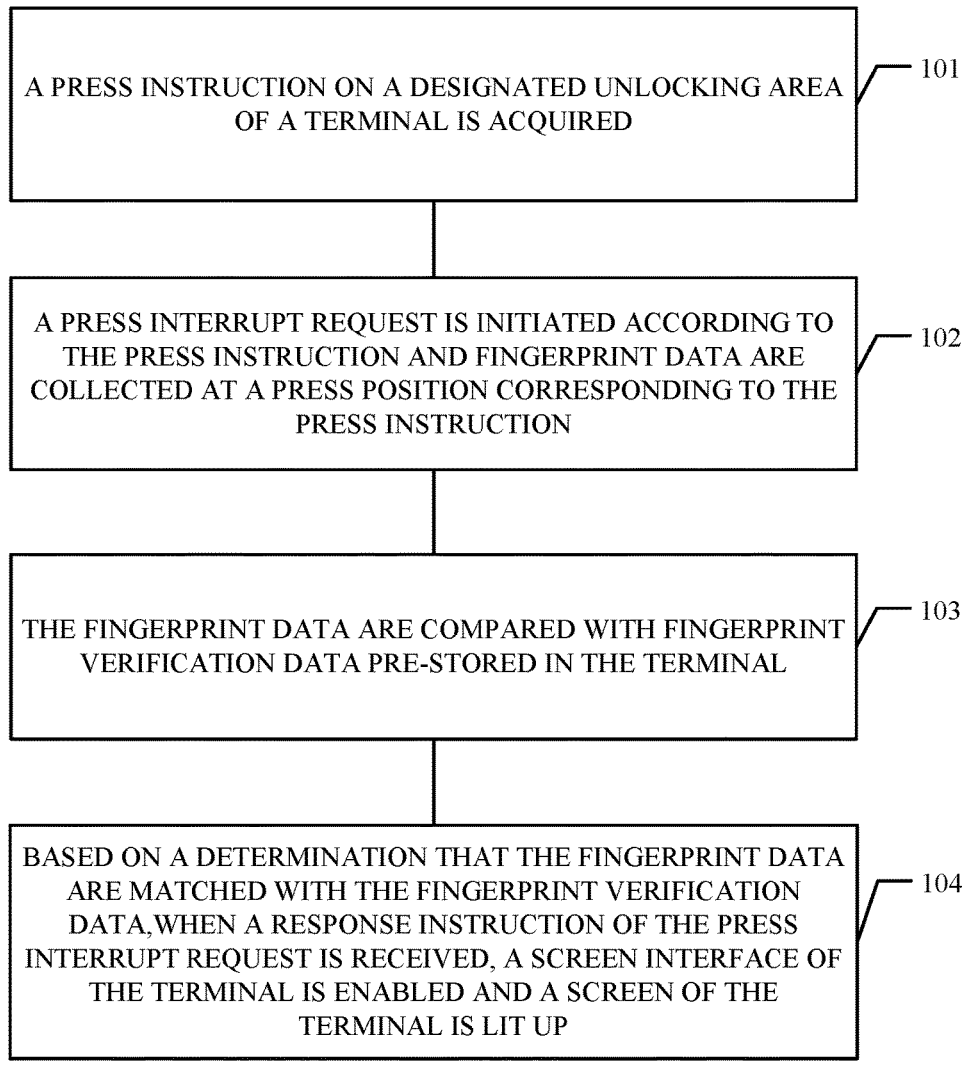
FIG. 1 is a schematic flow diagram illustrating a method for screen unlocking of a terminal based on fingerprint identification according to an implementation of the disclosure.

Hereinafter, technical solutions embodied in implementations of the disclosure will be described in a clear and comprehensive manner in conjunction with the accompanying drawings. It is evident that the implementations described herein are merely some rather than all of the implementations of the disclosure. Those of ordinary skill in the art will be able to derive other implementations based on these implementations without creative work, and all such derived implementations shall fall in the protection scope of the disclosure.

In at least one implementation, the terminal described in the implementations of the present disclosure may include a smart phone, a tablet, a personal digital assistant (PDA), a mobile internet device (MID), a smart wearable device (such as a smart watch, a smart bracelet) and other devices, the present disclosure is not limited thereto. The following describes the mobile phone as an example to describe a method for screen unlocking of a terminal based on fingerprint identification and a terminal provided in the implementations of the present disclosure in detail.

In implementations of the present disclosure, a method for unlocking a screen of a terminal is provided, which includes the follows: acquiring a press instruction on a designated unlocking area of the terminal; initiating a press interrupt request according to the press instruction and collecting fingerprint data at a press position corresponding to the press instruction; comparing the fingerprint data with fingerprint verification data pre-stored in the terminal; enabling a screen interface of the terminal and lighting up the screen of the terminal when a response instruction of the press interrupt request is received, based on a determination that the fingerprint data and the fingerprint verification data are matched.

In one implementation, prior to acquiring the press instruction, the method may further include: acquiring a touch instruction on the designated unlocking area of the terminal when the screen of the terminal is in a normal operation state and the terminal is in a fingerprint collection mode; collecting fingerprint data of a touch finger corresponding to the touch instruction and extracting fingerprint ridges of the touch finger from the fingerprint data; setting the fingerprint ridges of the touch finger as the fingerprint verification data, storing the fingerprint verification data into a designated storage area of the terminal, and exiting the fingerprint collection mode of the terminal.

Further, in one implementation, the method may further include the follows after collecting the fingerprint data at the press position: extracting, according to the fingerprint data, fingerprint ridges of a pressing finger triggering the press instruction, to perform the comparing according to the fingerprint ridges of the pressing finger.

In one implementation, the operation of lighting up a screen of the terminal includes: acquiring light sensation data of a current environment; determining target brightness of the screen according to the light sensation data; lighting up the screen of the terminal according to the target brightness.

A terminal including a memory and a processor is further provided. The memory is configured to store a set of program codes, and the processor is coupled with the memory via a bus. The processor is configured to invoke the set of program codes stored in the memory to perform operations of the method described above.

A non-transitory computer storage medium is provided. The non-transitory computer storage medium is configured to store programs that, when executed, are operable to perform operations of the method described above.

Implementations of the present disclosure will be detailed below with reference to the accompanying drawings.

Referring to FIG. 1, FIG. 1 is a schematic flow diagram illustrating a method for screen unlocking of a terminal based on fingerprint identification according to an implementation of the disclosure. The method described in the implementations of the disclosure may begin at block 101.

At block 101, a press instruction on a designated unlocking area of the terminal is acquired.

In some possible implementations, a designated unlocking area can be set in advance when a screen of a mobile phone is in a normal operation state (that is, the screen is not locked) to acquire a user operation instruction for unlocking. The designated unlocking area may include a Home button of the mobile phone, a touch interface of the screen of the mobile phone (that is, a touch screen of the mobile phone), and a designated key interface of the mobile phone, where the designated key interface of the mobile phone may be an operation interface of any virtual button or a button contact surface of any physical button other than the touch interface and the Home button of the mobile phone. The disclosure is not limited thereto.

In some possible implementations, after the mobile phone sets the designated unlocking area in advance, when the mobile phone is in a lock-screen state, state of a user operation on the designated unlocking area can be monitored through a built-in processor and other modules. As an example, when the mobile phone detects that there is a user operation signal on the designated unlocking area, a user operation instruction on the designated unlocking area may be acquired. The user operation instruction may include a touch instruction or a press instruction. The disclosure is not limited thereto. In particular, when the mobile phone detects the touch operation on the above designated unlocking area and a strength value of the touch operation is less than a preset strength threshold, the mobile phone can determine that the touch operation is just a touch action rather than a press action and can further determine that the user operation instruction is a touch instruction. On the other hand, when the mobile phone detects the touch operation on the above designated unlocking area and the strength value of the touch operation is greater than the preset strength threshold, the mobile phone can determine that the touch operation is a triggering action prior to a press operation and can further determine that the user operation instruction is a press instruction.

At block 102, a press interrupt request is initiated according to the press instruction and fingerprint data are collected at a press position corresponding to the press instruction.

Figure 2:
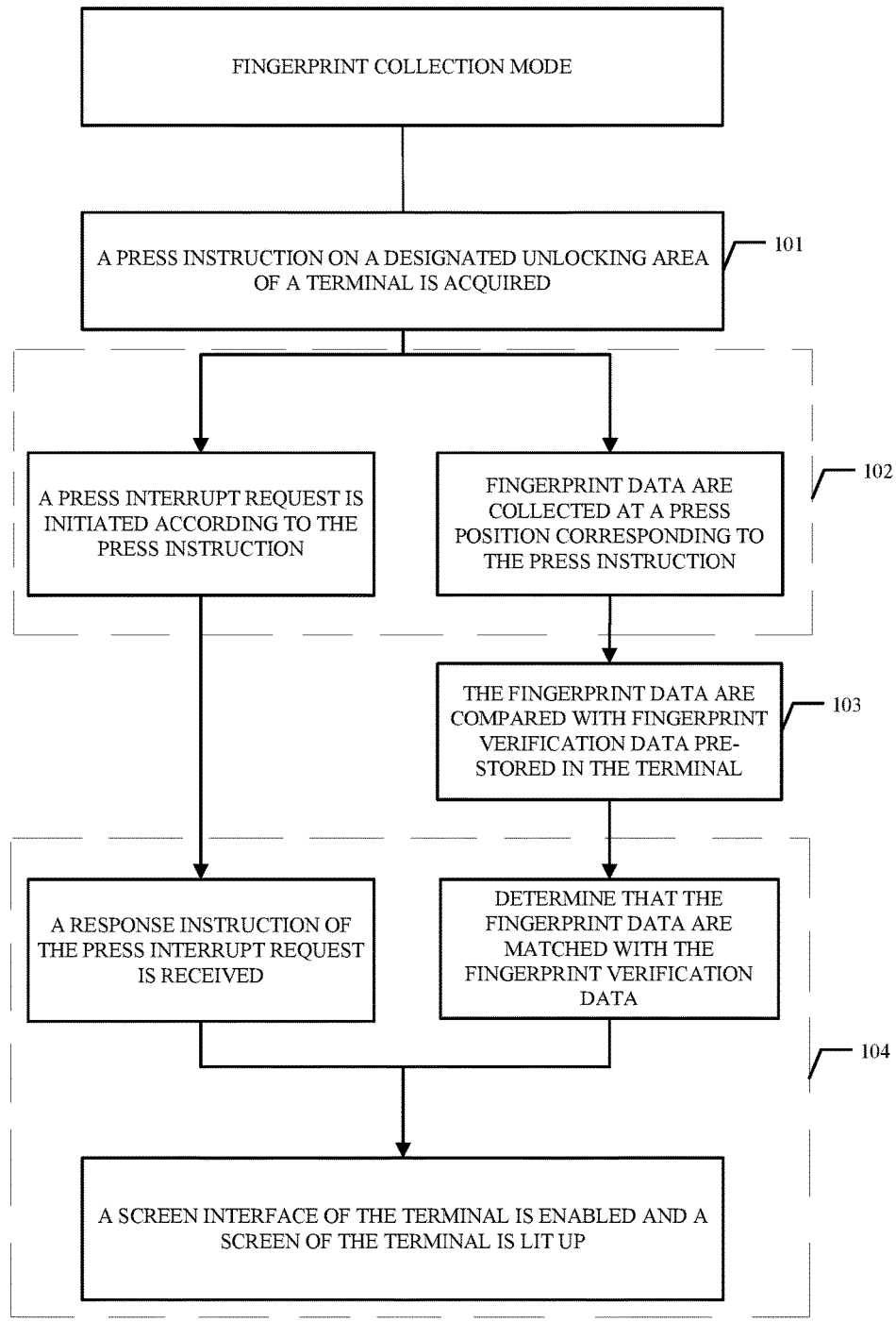
FIG. 2 is a schematic flow diagram illustrating a method for screen unlocking of a terminal based on fingerprint identification according to an implementation of the disclosure.

In some possible implementations, after the mobile phone acquires the press instruction on the designated unlocking area, a press interrupt request can be sent to the processor or other modules of the mobile phone, to respond to the press instruction through the processor. As an example, when the mobile phone detects the press instruction on the designated unlocking area, during a process of sending the press interrupt request to the processor or other modules, fingerprint data are collected at a press position corresponding to the press instruction, therefore fingerprint comparison can be performed according to the fingerprint data. As another example, the mobile phone can first acquire fingerprint data at a touch position corresponding to a touch operation to perform fingerprint comparison according to the fingerprint data, when the mobile phone detects the touch operation on the designated unlocking area but still has not determined that an instruction corresponding to the touch operation is a press instruction according to a touch strength value. Furthermore, when the mobile phone determines that the touch instruction is a press instruction according to a strength value of the touch operation, the press interrupt request can be sent to the processor or other modules. That is, the press interrupt request of the press instruction can be initiated simultaneously with the process of collecting and comparing the fingerprint data at the press position corresponding to the press instruction (as illustrated in FIG. 2), or the fingerprint data can be collected and compared before initiating the press interrupt request, or the press interrupt request can be initiated before collecting and comparing the fingerprint data. The above-mentioned operations can be executed in a different order according to actual application scenarios and the disclosure is not limited thereto.

At block 103, the fingerprint data are compared with fingerprint verification data pre-stored in the terminal.

In some possible implementations, before the mobile phone unlocks the screen thereof through fingerprint identification, that is, before acquiring the press instruction on the designated unlocking area, as illustrated in FIG. 2, a fingerprint collection mode can be set for the mobile phone. When the mobile phone needs to collect the fingerprint verification data for unlocking the screen and the screen of the mobile phone is in the normal operation state, that is, the screen of the mobile phone is not locked, the fingerprint collection mode can be enabled and the touch instruction on the designated unlocking area can be acquired in the fingerprint collection mode. Furthermore, after the mobile phone acquires the touch instruction on the designated unlocking area, fingerprint data of a touch finger corresponding to the touch instruction can be collected, therefore it is possible to extract fingerprint ridges of the touch finger from the fingerprint data. After the mobile phone extracts the fingerprint ridges of the touch finger, the fingerprint ridges of the touch finger can be set as the fingerprint verification data. The fingerprint verification data can be set as registered fingerprint data, which will be used for comparing for unlocking the screen of the mobile phone. After the mobile phone acquires the fingerprint verification data, the mobile phone can store the fingerprint verification data into a designated storage area of the mobile phone and exit the fingerprint collection mode of the mobile phone to avoid duplicate data collection and wasting power consumption of the mobile phone. The designated storage area of the mobile phone may include a built-in storage space of the mobile phone (that is, a memory that comes with the mobile phone), an external storage space of the mobile phone (such as a secure digital memory card (SD card)), a cloud storage space of the mobile phone, and the like. The disclosure is not limited thereto.

In some possible implementations, after the mobile phone collects the fingerprint data at the press position corresponding to the press instruction, fingerprint ridges of a pressing finger corresponding to the press instruction can be extracted from the fingerprint data and therefore, the fingerprint ridges of the pressing finger can be compared with fingerprint ridges contained in the fingerprint verification data pre-stored in the mobile phone. When the mobile phone determines that the fingerprint ridges of the pressing finger are consistent with the fingerprint ridges contained in the fingerprint verification data, the mobile phone can determine that the fingerprint ridges of the pressing finger and the fingerprint ridges contained in the fingerprint verification data are matched.

At block 104, based on a determination that the fingerprint data are matched with the fingerprint verification data, when a response instruction of the press interrupt request is received, a screen interface of the terminal is enabled and the screen of the terminal is lit up. Specifically, as illustrated in FIG. 2, when a response instruction of the press interrupt request is received and the fingerprint data are matched with the fingerprint verification data, the screen will be lit up.

In some possible implementations, after determining that the fingerprint data and the fingerprint verification data are matched, the mobile phone proceeds to unlocking the screen of the mobile phone. In at least one implementation, unlocking of the screen of the mobile phone can be triggered by the response instruction of the press interrupt request of the press instruction. When the mobile phone receives the response instruction of the press interrupt request, the screen interface of the mobile phone can be directly enabled and the screen of the mobile phone can be lit up without the need of fingerprint comparison and the like.

In this implementation, when the mobile phone acquires the press instruction on the designated unlocking area of the terminal, the mobile phone can initiate the press interrupt request according to the press instruction. When waiting for the response instruction of the press interrupt request, the mobile terminal can collect the fingerprint data at the press position corresponding to the press instruction and then compare the fingerprint data with the fingerprint verification data pre-stored. When the fingerprint data are matched with the fingerprint verification data, the screen interface of the terminal can be enabled and the screen of the terminal can be lit up when the response instruction of the press interrupt request is received. According to the implementation of the disclosure, processes for screen unlocking can be performed in parallel. That is, fingerprint acquisition and verification can be performed during waiting for the response instruction of the press interrupt request, such that the screen of the mobile phone can be unlocked directly when the response instruction of press interrupt request is received, therefore improving the efficiency of screen unlocking and enhancing user experience of screen unlocking.

In some implementations, the terminal lights up the screen of the terminal as follows. The terminal acquires light sensation data of a current environment, determines target brightness of the screen according to the light sensation data, and lights up the screen of the terminal according to the target brightness.

Figure 3:
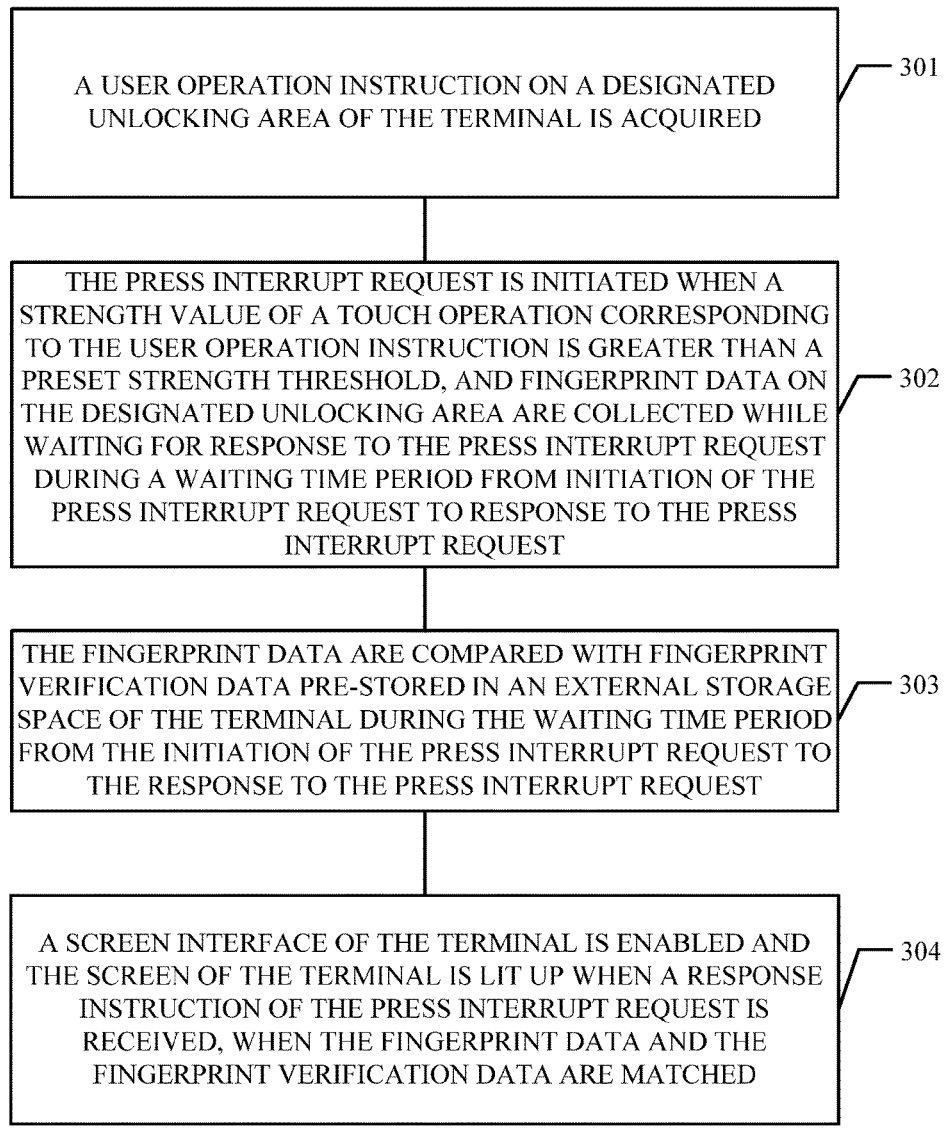
FIG. 3 is a schematic flow diagram illustrating a method for screen unlocking of a terminal based on fingerprint identification according to an implementation of the disclosure.

Referring to FIG. 3, FIG. 3 is a schematic flow diagram illustrating a method for screen unlocking of a terminal based on fingerprint identification according to an implementation of the disclosure. The method described in the implementations of the disclosure may begin at block 301.

At block 301, a user operation instruction on a designated unlocking area of the terminal is acquired. The user operation instruction is configured to trigger screen unlocking of the terminal. The screen unlocking of the terminal includes acquiring the user operation instruction, initiating a press interrupt request, responding to the press interrupt request, unlocking a lock-screen interface of the terminal, and lighting up a screen.

At block 302, the press interrupt request is initiated when a strength value of a touch operation corresponding to the user operation instruction is greater than a preset strength threshold, and fingerprint data on the designated unlocking area are collected while waiting for response to the press interrupt request during a waiting time period from initiation of the press interrupt request to response to the press interrupt request.

The press interrupt request is configured to request a processor to respond to the user operation instruction.

At block 303, the fingerprint data are compared with fingerprint verification data pre-stored in an external storage space of the terminal during the waiting time period from the initiation of the press interrupt request to the response to the press interrupt request.

At block 304, a screen interface of the terminal is enabled and the screen of the terminal is lit up when a response instruction of the press interrupt request is received, when the fingerprint data and the fingerprint verification data are matched.

As an implementation, the designated unlocking area of the terminal includes at least one of a Home button of the terminal, a touch interface of the screen of the terminal, and a designated key interface of the terminal.

As an implementation, the method further comprises the following after the fingerprint data on the designated unlocking area are collected.

Fingerprint ridges of a press finger triggering a press instruction are extracted, according to the fingerprint data, to perform the comparing according to the fingerprint ridges of the press finger.

As an implementation, the method further comprises the following.

A touch instruction on the designated unlocking area of the terminal is acquired when the screen of the terminal is in a normal operating state and the terminal is in a fingerprint collection mode.

Fingerprint data of a touch finger corresponding to the touch instruction are collected and fingerprint ridges of the touch finger from the fingerprint data are extracted.

The fingerprint ridges of the touch finger are set as the fingerprint verification data, the fingerprint verification data are stored into a designated storage area of the terminal, and the fingerprint collection mode of the terminal is exited. The designated storage area includes the external storage space of the terminal.

Figure 4A:
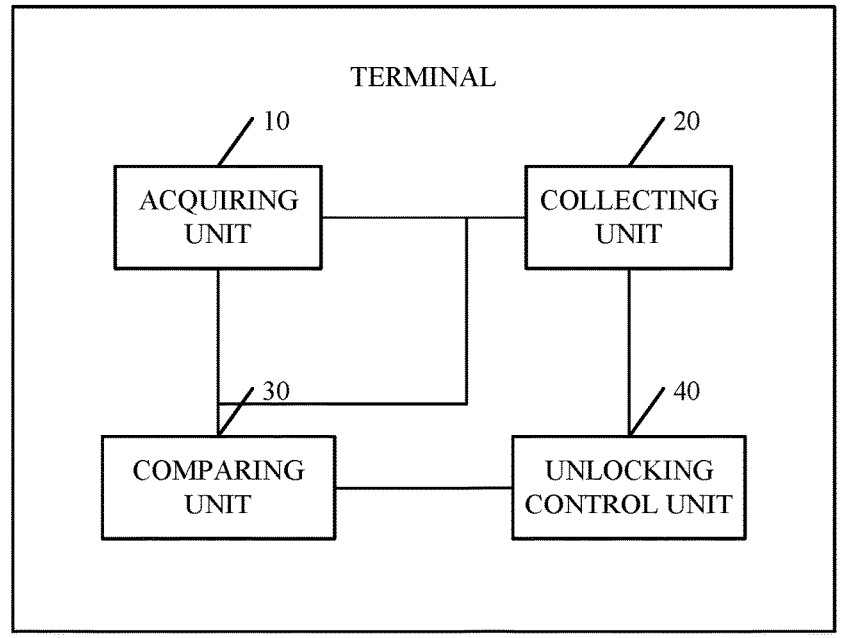
FIG. 4A is a schematic structural diagram illustrating a terminal according to an implementation of the disclosure.

Referring to FIG. 4A, FIG. 4A is a schematic structural diagram illustrating a terminal according to an implementation of the disclosure. The terminal described in this implementation includes an acquiring unit 10, a collecting unit 20, a comparing unit 30, and an unlocking control unit 40. The components listed above can be integrated into a fingerprint sensor or a fingerprint sensor module. Alternatively, the unlocking control unit 40 can be implemented as a controller separated from the fingerprint sensor. For the specific structure, the present disclosure is not particularly limited.

The acquiring unit 10 is configured to acquire a press instruction on a designated unlocking area of the terminal. The user operation instruction is configured to trigger screen unlocking of the terminal. The screen unlocking of the terminal includes acquiring the user operation instruction, initiating a press interrupt request, responding to the press interrupt request, unlocking a lock-screen interface of the terminal, and lighting up a screen. The acquiring unit 10 can be a sensor or a circuit.

The collecting unit 20 is configured to initiate a press interrupt request when a strength value of a touch operation corresponding to the user operation instruction is greater than a preset strength threshold and collect fingerprint data on the designated unlocking area while waiting for response to the press interrupt request during a waiting time period from initiation of the press interrupt request to response to the press interrupt request. The press interrupt request is configured to request a processor to respond to the user operation instruction. The collecting unit 20 can be a processor, a circuit, or control components coupled to or integrated in the processor.

The comparing unit 30 is configured to compare the fingerprint data collected by the collecting unit 20 with fingerprint verification data pre-stored in an external storage space of the terminal during the waiting time period from the initiation of the press interrupt request to the response to the press interrupt request. The comparing unit 30 can be a processor, a circuit, or control components coupled to or integrated in the processor.

The unlocking control unit 40 is configured to enable a screen interface of the terminal and light up a screen of the terminal when a response instruction of the press interrupt request is received, after the comparing unit 30 determines that the fingerprint data and the fingerprint verification data are matched. The unlocking control unit 40 can be a processor, a circuit, or control components coupled to or integrated in the processor.

In some possible implementations, the collecting unit 20 is further configured to acquire a touch instruction on the designated unlocking area of the terminal, collect fingerprint data of a touch finger corresponding to the touch instruction, and extract fingerprint ridges of the touch finger from the fingerprint data, when the screen of the terminal is in a normal operation state and the terminal is in a fingerprint collection mode.

Further, in some possible implementations, the collecting unit 20 is further configured to extract, according to the fingerprint data, fingerprint ridges of a pressing finger triggering the press instruction, such that the comparing unit 30 can perform the comparison for screen unlocking according to the fingerprint ridges of the pressing finger.

Figure 4B:
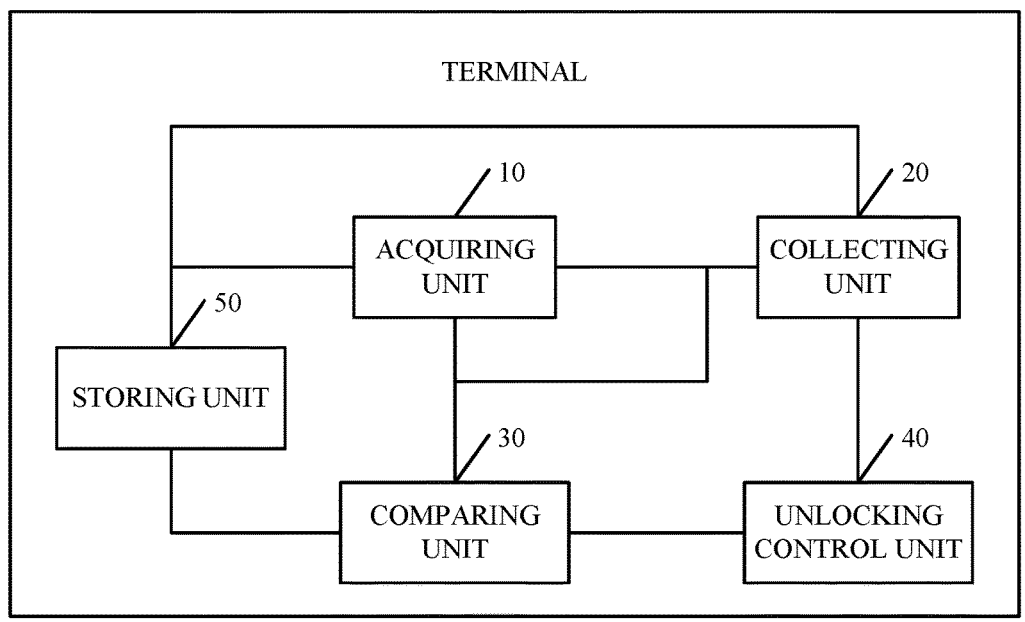
FIG. 4B is a schematic structural diagram illustrating a terminal according to an implementation of the disclosure.

In some possible implementations, as illustrated in FIG. 4B, FIG. 4B is another schematic structural diagram illustrating a terminal according to an implementation of the disclosure. The terminal described in this implementation further includes a storing unit 50.

The storing unit 50 is configured to set the fingerprint ridges of the touch finger extracted by the collecting unit 20 as the fingerprint verification data, store the fingerprint verification data into a designated storage area of the terminal. The unlocking control unit 40 may control the terminal to exit the fingerprint collection mode.

The storing unit 50 can be a high-speed RAM memory, or a non-volatile memory, such as a disk memory.

In some possible implementations, when a screen of a mobile phone is in a normal operation state (that is, the screen is not locked), the acquiring unit 10 of the mobile phone can set a designated unlocking area in advance to acquire a user operation instruction for unlocking. Obviously, the designated unlocking area can also be set by other components of the terminal in various manners. The designated unlocking area may include a Home button of the mobile phone, a touch interface of the screen of the mobile phone (that is, a touch screen of the mobile phone), and a designated key interface of the mobile phone. The designated key interface of the mobile phone may be an operation interface of any virtual button or a button contact surface of any physical button other than the touch interface and the Home button of the mobile phone. The disclosure is not limited thereto.

In some possible implementations, after the acquiring unit 10 sets the designated unlocking area in advance, when the mobile phone is in a lock-screen state, state of a user operation on the designated unlocking area can be monitored through a built-in processor or other modules of the mobile phone. When the acquiring unit 10 detects that there is a user operation signal on the designated unlocking area, a user operation instruction on the designated unlocking area may be acquired. The user operation instruction may include a touch instruction or a press instruction and the disclosure is not limited thereto. In particular, when the acquiring unit 10 detects the touch operation on the above designated unlocking area and a strength value of the touch operation is less than a preset strength threshold, the acquiring unit 10 can determine that the touch operation is just a touch action rather than a press action and can further determine that the user operation instruction is a touch instruction. On the other hand, when the acquiring unit 10 detects the touch operation on the above designated unlocking area and the strength value of the touch operation is greater than the preset strength threshold, the acquiring unit 10 can determine that the touch operation is a triggering action prior to a press operation and can further determine that the user operation instruction is a press instruction.

In some possible implementations, after the acquiring unit 10 acquires the press instruction on the designated unlocking area, the collecting unit 20 sends a press interrupt request to the processor or other modules of the mobile phone, to respond to the press instruction through the processor. More particularly, when the acquiring unit 10 detects the press instruction on the designated unlocking area, during a process of sending the press interrupt request to the processor or other modules, fingerprint data at a press position corresponding to the press instruction can be collected by the collecting unit 20 to perform the comparing according to the fingerprint data. As another example, the collecting unit 20 can first collect the fingerprint data at a touch position corresponding to the touch operation, to perform the comparing according to the fingerprint data, when the acquiring unit 10 detects the touch operation on the designated unlocking area but still has not determined that an instruction corresponding to the touch operation is a press instruction according to a touch strength value. Further, when the acquiring unit 10 determines the strength value corresponding to the touch operation and determines that the instruction corresponding to the touch operation is a press instruction, the press interrupt request can be sent to the processor or other modules. That is, the collecting unit 20 can perform operations of initiating the press interrupt request of the press instruction as well as collecting and comparing the fingerprint data at the press position corresponding to the press instruction simultaneously. Alternatively, the collecting unit 20 can collect and compare the fingerprint data first and then initiate the press interrupt request, or the collecting unit 20 can initiate the press interrupt request and then collect and compare the fingerprint data. The above-mentioned operations can be performed in a different order determined according to actual application scenarios and the disclosure is not limited thereto.

In some possible implementations, before the mobile phone unlocks the screen thereof through fingerprint identification, that is, before the acquiring unit 10 acquires the press instruction on the fingerprint unlocking area, the mobile terminal can set a fingerprint collection mode. When the collecting unit 20 needs to collect fingerprint verification data for screen unlocking, the acquiring unit 10 can enable the fingerprint collection mode and acquire a touch instruction on the designated unlocking area in the fingerprint collection mode, when the screen of the mobile phone is in a normal operation state, that is, in an operation state where the screen of the mobile phone is not locked. Further, after the acquiring unit 10 acquires the touch instruction on the designated unlocking area, the collecting unit 20 can collect the fingerprint data of a touch finger corresponding to the touch instruction, so that fingerprint ridges of the touch finger can be extracted from the fingerprint data. After the collecting unit 20 extracts the fingerprint ridges of the touch finger, the fingerprint ridges of the touch finger can be set as the fingerprint verification data by the storing unit 50. The fingerprint verification data can be used as registered fingerprint data for screen unlocking of the mobile phone. After the collecting unit 20 acquires the fingerprint verification data, the storing unit 50 can store the fingerprint verification data into a designated storage area of the mobile phone and exit the fingerprint collection mode of the mobile phone to avoid duplicate data collection and wasting power consumption of the mobile phone. The designated storage area of the mobile phone may include a built-in storage space of the mobile phone (that is, a memory that comes with the mobile phone), an external storage space of the mobile phone (such as a SD card), a cloud storage space of the mobile phone, and the like. The disclosure is not limited thereto.

In some possible implementations, after the collecting unit 20 collects the fingerprint data at the press position corresponding to the press instruction, fingerprint ridges of a pressing finger corresponding to the press instruction can be extracted from the fingerprint data. The comparing unit 30 compares the fingerprint ridges with fingerprint ridges contained in the fingerprint verification data pre-stored in the mobile phone. When the comparing unit 30 determines that the fingerprint ridges of the pressing finger are consistent with the fingerprint ridges contained in the fingerprint verification data, the comparing unit 30 can determine that the fingerprint ridges of the pressing finger and the fingerprint ridges contained in the fingerprint verification data are matched.

In some possible implementations, after the comparing unit 30 determines that the fingerprint data are matched with the fingerprint verification data, the unlocking control unit 40 can unlock the screen of the mobile phone. More particularly, screen unlocking of the mobile phone can be triggered by the response instruction of the press interrupt request of the press instruction. When the unlocking control unit 40 receives the response instruction of the press interrupt request, the screen interface of the mobile phone can be directly enabled and the screen of the mobile phone can be lit up, without the need of fingerprint comparison and the like.

In some possible implementations, the unlocking control unit 40 configured to light up the screen of the terminal is configured to acquire light sensation data of a current environment, determine target brightness of the screen according to the light sensation data, and light up the screen of the terminal according to the target brightness.

According to implementations of the disclosure, when the mobile phone acquires the press instruction on the designated unlocking area of the terminal, a press interrupt request is initiated according to the press instruction. When waiting for the response instruction of the press interrupt request, the mobile terminal can collect the fingerprint data at the press position corresponding to the press instruction and then compare the fingerprint data with the fingerprint verification data pre-stored. Based on a determination that the fingerprint data and the fingerprint verification data are matched, when the response instruction of the press interrupt request is received, the screen interface of the terminal is enabled and the screen of the terminal is lit up. According to the implementations of the disclosure, processes for screen unlocking can be performed in parallel. That is, fingerprint acquisition and verification can be performed during waiting for the response instruction of the press interrupt request, such that the screen of the mobile phone can be unlocked directly when the response instruction of press interrupt request is received, therefore improving the efficiency of screen unlocking and enhancing user experience of screen unlocking.

Figure 5:
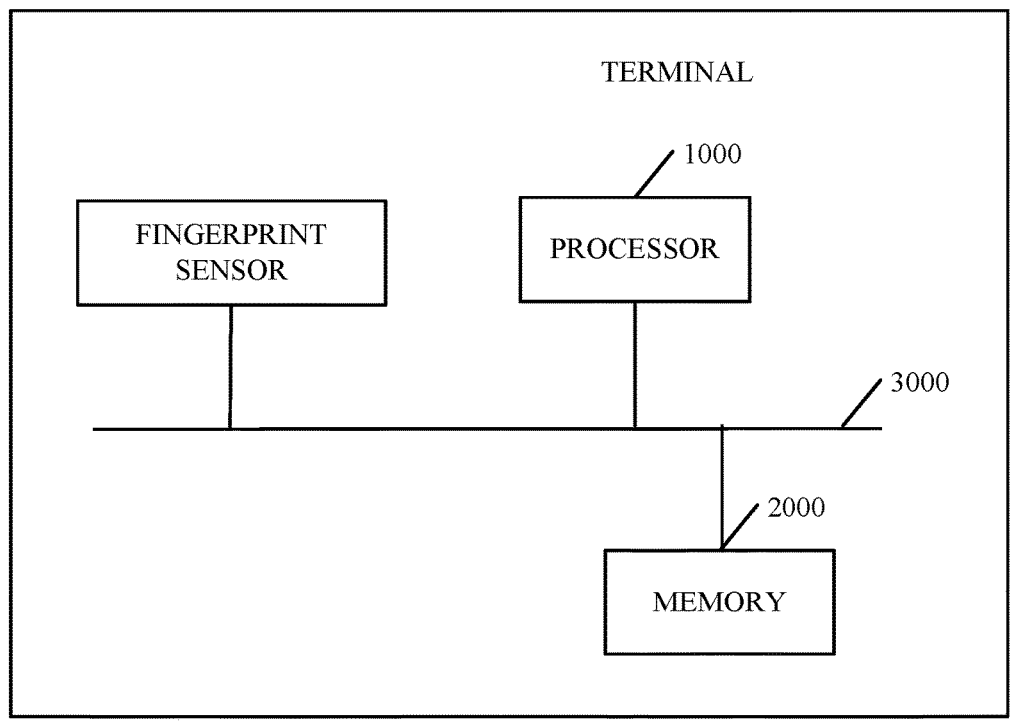
FIG. 5 is another schematic structural diagram illustrating a terminal according to an implementation of the disclosure.

Operations of the components of the terminal of FIG. 4A or FIG. 4B can be implemented via a computer system including at least one processor and at least one memory. The at least one memory is configured to store program codes that, when executed by the processor, are operable with the computer system to perform operations of the components of the terminal of FIG. 4A or FIG. 4B. The computer system can be embodied in a terminal. FIG. 5 illustrates an example of such terminal.

Referring to FIG. 5, FIG. 5 is another schematic structural diagram illustrating a terminal according to an implementation of the disclosure. The terminal described in this implementation includes a processor 1000 and a memory 2000. The processor 1000 is coupled with the memory 2000 through a bus 3000. As one implementation, the terminal may further include a fingerprint sensor coupled with the processor 1000 and the memory 2000. The fingerprint sensor is configured to receive user operations such as a touch operation and a press operation, and extract fingerprint data or fingerprint ridges for subsequent fingerprint comparison.

The memory 2000 may be a high-speed random access memory (RAM) or a non-volatile memory such as magnetic disk storage.

The memory 2000 is configured to store a set of program codes and the processor 1000 is configured to invoke the program codes stored in the memory 2000 to perform the following operations: acquiring a press instruction on the designated unlocking area of the terminal; initiating a press interrupt request according to the press instruction and collecting fingerprint data at a press position corresponding to the press instruction; comparing the fingerprint data with fingerprint verification data pre-stored in the terminal; based on a determination that the fingerprint data and the fingerprint verification data are matched, when a response instruction of the press interrupt request is received, enabling a screen interface of the terminal and lighting up the screen of the terminal.

In some possible implementations, the designated unlocking area of the terminal includes at least one of a Home button of the terminal, a touch interface of the screen of the terminal, and a designated key interface of the terminal.

In some possible implementations, the processor 1000 is further configured to extract, according to the fingerprint data, fingerprint ridges of a pressing finger triggering the press instruction, to perform the comparing for unlocking the screen of the terminal, according to the fingerprint ridges of the pressing finger.

In some possible implementations, the processor 1000 is further configured to: acquire a touch instruction on the designated unlocking area of the terminal when the screen of the terminal is in a normal operation state and the terminal is in a fingerprint collection mode; collect fingerprint data of a touch finger corresponding to the touch instruction; extract fingerprint ridges of the touch finger from the fingerprint data; set the fingerprint ridges of the touch finger as the fingerprint verification data, store the fingerprint verification data into a designated storage area of the terminal through the memory 2000, and exit the fingerprint collection mode of the terminal.

More particularly, the terminal described in this implementation of the present disclosure can execute implementations described in the implementation of a method for screen unlocking of a terminal based on fingerprint identification provided in the implementations of the present disclosure through each of built-in modules (such as the memory 2000 and the processor 1000) or can execute implementations described in the implementations of the terminal provided in the implementations of the present disclosure. For specific implementation process that will not be elaborated herein, reference may be made to the foregoing implementations.

According to implementations of the disclosure, there is provided a computer storage medium, which is configured to store programs, and when executed, the programs are configured to perform part or all of the operations of any of the method for screen unlocking of a terminal based on fingerprint identification described in the above method implementations.

A person of ordinary skill in the art may understand that all or part of the processes of implementing the methods in the foregoing implementations may be achieved by a computer program instructing relevant hardware. The programs may be stored in a computer-readable storage medium, and when executed, the programs are configured to perform processes of the implementations of the above methods. The storage medium may be a magnetic disk, an optical disk, a read-only memory (ROM), a random access memory (RAM), or the like.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for screen unlocking of a terminal based on fingerprint identification, comprising:
   acquiring a user operation instruction on a designated unlocking area of the terminal, the user operation instruction being configured to trigger screen unlocking of the terminal, the screen unlocking of the terminal comprising acquiring the user operation instruction, initiating a press interrupt request, responding to the press interrupt request, unlocking a lock-screen interface of the terminal, and lighting up a screen;
initiating the press interrupt request when a strength value of a touch operation corresponding to the user operation instruction is greater than a preset strength threshold, the press interrupt request being configured to request a processor to respond to the user operation instruction and configured to trigger to light the screen;
collecting fingerprint data on the designated unlocking area and comparing the fingerprint data with fingerprint verification data pre-stored in an external storage space of the terminal while waiting for response to the press interrupt request during a waiting time period from initiation of the press interrupt request to response to the press interrupt request, the response to the press interrupt request being configured to enable a screen interface of the terminal and lighting up the screen of the terminal when the fingerprint data and the fingerprint verification data are matched; and
enabling the screen interface of the terminal and lighting up the screen of the terminal when the response instruction of the press interrupt request is received, when the fingerprint data and the fingerprint verification data are matched.

2. The method of claim 1, wherein the designated unlocking area of the terminal comprises at least one of a Home button of the terminal, a touch interface of the screen of the terminal, and a designated key interface of the terminal.

3. The method of claim 1, wherein the method further comprises the following after collecting the fingerprint data on the designated unlocking area:
extracting, according to the fingerprint data, fingerprint ridges of a press finger triggering a press instruction, to perform the comparing according to the fingerprint ridges of the press finger.

4. The method of claim 1, further comprising:
acquiring a touch instruction on the designated unlocking area of the terminal when the screen of the terminal is in a normal operating state and the terminal is in a fingerprint collection mode;
collecting fingerprint data of a touch finger corresponding to the touch instruction and extracting fingerprint ridges of the touch finger from the fingerprint data; and
setting the fingerprint ridges of the touch finger as the fingerprint verification data, storing the fingerprint verification data into a designated storage area of the terminal, and exiting the fingerprint collection mode of the terminal, the designated storage area comprising the external storage space of the terminal.

5. A terminal, comprising:
a memory, configured to store a set of program codes; and
a processor, configured to invoke the set of program codes stored in the memory to:
acquire a user operation instruction on a designated unlocking area of the terminal, the user operation instruction being configured to trigger screen unlocking of the terminal, the screen unlocking of the terminal comprising acquiring the user operation instruction, initiating a press interrupt request, responding to the press interrupt request, unlocking a lock-screen interface of the terminal, and lighting up a screen;
initiate the press interrupt request when a strength value of a touch operation corresponding to the user operation instruction is greater than a preset strength threshold, the press interrupt request being configured to request a processor to respond to the user operation instruction and configured to trigger to light the screen;
collect fingerprint data on the designated unlocking area and compare the fingerprint data with fingerprint verification data pre-stored in an external storage space of the terminal while waiting for response to the press interrupt request during a waiting time period from initiation of the press interrupt request to response to the press interrupt request, the response to the press interrupt request being configured to enable a screen interface of the terminal and lighting up the screen of the terminal when the fingerprint data and the fingerprint verification data are matched; and
enable the screen interface of the terminal and lighting up the screen of the terminal when the response instruction of the press interrupt request is received, when the fingerprint data and the fingerprint verification data are matched.

6. The terminal of claim 5, wherein the designated unlocking area of the terminal comprises at least one of a Home button of the terminal, a touch interface of the screen of the terminal, and a designated key interface of the terminal.

7. The terminal of claim 5, wherein the processor is further configured to invoke the set of program codes stored in the memory to:
acquire a touch instruction on the designated unlocking area of the terminal when the screen of the terminal is in a normal operating state and the terminal is in a fingerprint collection mode;
collect fingerprint data of a touch finger corresponding to the touch instruction and extracting fingerprint ridges of the touch finger from the fingerprint data; and
set the fingerprint ridges of the touch finger as the fingerprint verification data, store the fingerprint verification data into a designated storage area of the terminal, and exit the fingerprint collection mode of the terminal, the designated storage area comprising the external storage space of the terminal.

8. The terminal of claim 5, wherein the processor is further configured to invoke the set of program codes stored in the memory to:
extract, according to the fingerprint data, fingerprint ridges of a press finger triggering a press instruction, to perform the comparing according to the fingerprint ridges of the press finger.

9. A non-transitory computer-readable storage medium storing a computer program which, when executed by a processor, causes the processor to carry out actions:
acquiring a user operation instruction on a designated unlocking area of the terminal, the user operation instruction being configured to trigger screen unlocking of the terminal, the screen unlocking of the terminal comprising acquiring the user operation instruction, initiating a press interrupt request, responding to the press interrupt request, unlocking a lock-screen interface of the terminal, and lighting up a screen;
initiating the press interrupt request when a strength value of a touch operation corresponding to the user operation instruction is greater than a preset strength threshold, the press interrupt request being configured to request a processor to respond to the user operation instruction and configured to trigger to light the screen;
collecting fingerprint data on the designated unlocking area and comparing the fingerprint data with fingerprint verification data pre-stored in an external storage space of the terminal while waiting for response to the press interrupt request during a waiting time period from initiation of the press interrupt request to response to the press interrupt request, the response to the press interrupt request being configured to enable a screen interface of the terminal and lighting up the screen of the terminal when the fingerprint data and the fingerprint verification data are matched; and enabling the screen interface of the terminal and lighting up the screen of the terminal when the response instruction of the press interrupt request is received, when the fingerprint data and the fingerprint verification data are matched.

10. The non-transitory computer-readable storage medium of claim 9, wherein the designated unlocking area of the terminal comprises at least one of a Home button of the terminal, a touch interface of the screen of the terminal, and a designated key interface of the terminal.

11. The non-transitory computer-readable storage medium of claim 9, wherein the computer program is further executed by the processor to carry out actions, comprising:

extracting, according to the fingerprint data, fingerprint ridges of a press finger triggering a press instruction, to perform the comparing according to the fingerprint ridges of the press finger.

12. The non-transitory computer-readable storage medium of claim 9, wherein the computer program is further executed by the processor to carry out actions, comprising:

acquiring a touch instruction on the designated unlocking area of the terminal when the screen of the terminal is in a normal operating state and the terminal is in a fingerprint collection mode;

collecting fingerprint data of a touch finger corresponding to the touch instruction and extracting fingerprint ridges of the touch finger from the fingerprint data; and setting the fingerprint ridges of the touch finger as the fingerprint verification data, storing the fingerprint verification data into a designated storage area of the terminal, and exiting the fingerprint collection mode of the terminal, the designated storage area comprising the external storage space of the terminal.

* * * * *